(12) United States Patent
Hayes et al.

(10) Patent No.: US 11,093,925 B2
(45) Date of Patent: Aug. 17, 2021

(54) METHODS AND SYSTEMS FOR PROVIDING CHARGEBACK SCORING FOR NETWORK TRANSACTIONS

(71) Applicant: MASTERCARD INTERNATIONAL INCORPORATED, Purchase, NY (US)

(72) Inventors: Anthony Hayes, Newtown, CT (US); Saurabh Mehta, Elmsford, NY (US)

(73) Assignee: MASTERCARD INTERNATIONAL INCORPORATED, Purchase, NY (US)

(\*) Notice: Subject to any disclaimer, the term of this patent is extended or adjusted under 35 U.S.C. 154(b) by 123 days.

(21) Appl. No.: 16/131,219

(22) Filed: Sep. 14, 2018

(65) Prior Publication Data

US 2019/0087805 A1    Mar. 21, 2019

Related U.S. Application Data

(60) Provisional application No. 62/559,065, filed on Sep. 15, 2017.

(51) Int. Cl.
  *G06Q 20/24* (2012.01)
  *G06Q 20/40* (2012.01)
  *G06N 7/00* (2006.01)

(52) U.S. Cl.
  CPC ............. *G06Q 20/24* (2013.01); *G06N 7/005* (2013.01); *G06Q 20/401* (2013.01); *G06Q 20/4016* (2013.01)

(58) Field of Classification Search
  CPC .. G06Q 20/24; G06Q 20/4016; G06Q 20/401; G06N 7/005
  See application file for complete search history.

(56) References Cited

U.S. PATENT DOCUMENTS 8,175,908 B1\*  5/2012  Anderson .......... G06Q 30/0201
                                                    705/7.29
9,984,372 B1\*  5/2018  Elrod .................... G06Q 20/405
                 (Continued)

OTHER PUBLICATIONS

R. Laurens and C. C. Zou, "Using Credit/Debit Card Dynamic Soft Descriptor as Fraud Prevention System for Merchant," 2016 IEEE Global Communications Conference (GLOBECOM), 2016, pp. 1-7, doi: 10.1109/GLOCOM.2016.7842369. (Year: 2016).\*

(Continued)

*Primary Examiner* — Bennett M Sigmond
*Assistant Examiner* — Bolko M Hamerski
(74) *Attorney, Agent, or Firm* — Harness, Dickey & Pierce, P.L.C.

(57) ABSTRACT

Systems and methods are provided for use in imposing chargeback probability scores on network transactions. One exemplary method includes obtaining at least one transaction detail of a network transaction between a consumer and a merchant. A computing device determines a chargeback probability score for the network transaction based, at least in part, on the at least one transaction detail. Chargeback data is transmitted to an entity associated with the network transaction, where the chargeback data includes at least one of (a) the chargeback probability score and (b) an indicator that the chargeback probability score fails to satisfy one or more thresholds, thereby permitting the entity to hold and/or decline the network transaction when the chargeback probability score fails to satisfy one or more thresholds.

10 Claims, 3 Drawing Sheets

(56) References Cited

U.S. PATENT DOCUMENTS

| | | | | |
|---|---|---|---|---|
| 2008/0288405 A1* | 11/2008 | John | .................... | G06Q 20/386 |
| | | | | 705/44 |
| 2010/0114774 A1* | 5/2010 | Linaman | ................ | G06Q 40/02 |
| | | | | 705/44 |
| 2010/0179906 A1* | 7/2010 | Hawkes | ................. | G06Q 20/02 |
| | | | | 705/44 |
| 2011/0161230 A1* | 6/2011 | Singh | ..................... | G06Q 20/32 |
| | | | | 705/44 |
| 2012/0203698 A1* | 8/2012 | Duncan | ................. | G06Q 20/34 |
| | | | | 705/44 |
| 2014/0188697 A1* | 7/2014 | Bruesewitz | .......... | G06Q 20/382 |
| | | | | 705/38 |
| 2015/0081541 A1* | 3/2015 | Hogg | ...................... | H04L 67/10 |
| | | | | 705/44 |
| 2015/0220920 A1* | 8/2015 | Howe | .................... | G06Q 20/40 |
| | | | | 705/44 |
| 2017/0178134 A1* | 6/2017 | Senci | .................. | G06Q 20/407 |
| 2018/0330353 A1* | 11/2018 | Prabhune | ............. | G06Q 20/227 |
| 2018/0374152 A1* | 12/2018 | Dominguez | ....... | G06Q 20/4016 |

OTHER PUBLICATIONS

E. Caldeira, G. Brandão and A. C. M. Pereira, "Characterizing and preventing chargebacks in next generation web payments services," 2012 Fourth International Conference on Computational Aspects of Social Networks (CASoN), 2012, pp. 333-338, doi: 10.1109/CASoN .2012.6412424. (Year: 2012).*

* cited by examiner

METHODS AND SYSTEMS FOR PROVIDING CHARGEBACK SCORING FOR NETWORK TRANSACTIONS

CROSS-REFERENCE TO RELATED APPLICATION

This application claims the benefit of, and priority to, U.S. Provisional Application No. 62/559,065 filed on Sep. 15, 2017. The entire disclosure of the above-referenced application is incorporated herein by reference.

FIELD

The present disclosure generally relates to methods and systems for use in providing chargeback scoring for network transactions, and in particular, to methods and systems for use in providing chargeback probability scoring for network transactions in real time (or near real time) for consideration in effecting decisions related to the network transactions.

BACKGROUND

This section provides background information related to the present disclosure which is not necessarily prior art.

Consumers are known to purchase products (e.g., goods and services, etc.) from merchants. Transactions to purchase the products are commonly funded by payment accounts. In connection with such payment account transactions, from time to time, chargebacks are requested by the consumers, or other parties to the transactions, whereby funds for the transactions are to be returned to the funding payment accounts. The chargeback process for a given transaction generally includes three cycles. A first, chargeback cycle includes an issuer of a funding payment account used in the transaction submitting a chargeback request and a reason code to an acquirer of the transaction. The reason code may relate to an authorization issue (e.g., 4812 "Account Number Not on File", etc.), a consumer dispute (e.g., 4855 "Goods or Services Not Provided", etc.), fraud (e.g., 4837 "No Cardholder Authorization", etc.), and/or processing errors, etc. After the first chargeback cycle, a second presentment cycle includes the acquirer submitting an acceptance of the chargeback to the issuer, where the acquirer can accept the chargeback, or the acquirer can contest the chargeback (based on evidence submitted by the merchant, etc.). Then, in a third cycle, when the acquirer contests the chargeback, the issuer may accept the chargeback as invalid or seek arbitration of the chargeback by a payment network for the transaction. When the chargeback is submitted for arbitration, such that the decision is made by the payment network, the losing party pays the transaction amount, filing fees, administrative fees, and other fees for the arbitration, as applicable.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Consumers often purchase products (e.g., goods and services, etc.) through use of payment accounts. From time to time, the consumers may dispute transactions to their payment accounts, causing chargebacks to be initiated for the transactions. The chargeback process may be costly for those involved in the transactions. Uniquely, the systems and methods herein provide chargeback probability scoring for transactions as they are initially being authorized, in real time or near real time, based on specific data, thereby permitting parties involved in the transactions (e.g., acquirers, payment networks, issuers, etc.) to potentially decline the transactions based on the chargeback probability scoring (such that actual chargebacks may not occur for the transactions). In particular, for example, a scoring engine gathers specific data related to consumers initiating the transactions, merchants involved, and/or the transactions themselves, etc., and compiles it into chargeback probability scores that are then indicative of an estimated likelihood that chargebacks will be requested for the transactions. In connection therewith, the chargeback probability scores are reported to issuers and/or acquirers involved in the transactions, via authorization messages (by appending the scores thereto), or otherwise. The issuers and/or the acquirers in turn use the chargeback probability scores, at least in part, as bases to decline the transactions (e.g., when the chargeback probability scores fail to satisfy one or more thresholds, etc.). In this manner, the parties involved in the payment account transactions may elect to decline certain transactions that are likely to involve chargebacks, thereby avoiding processing operations and/or costs incurred in association with the chargebacks.

Figure 1:
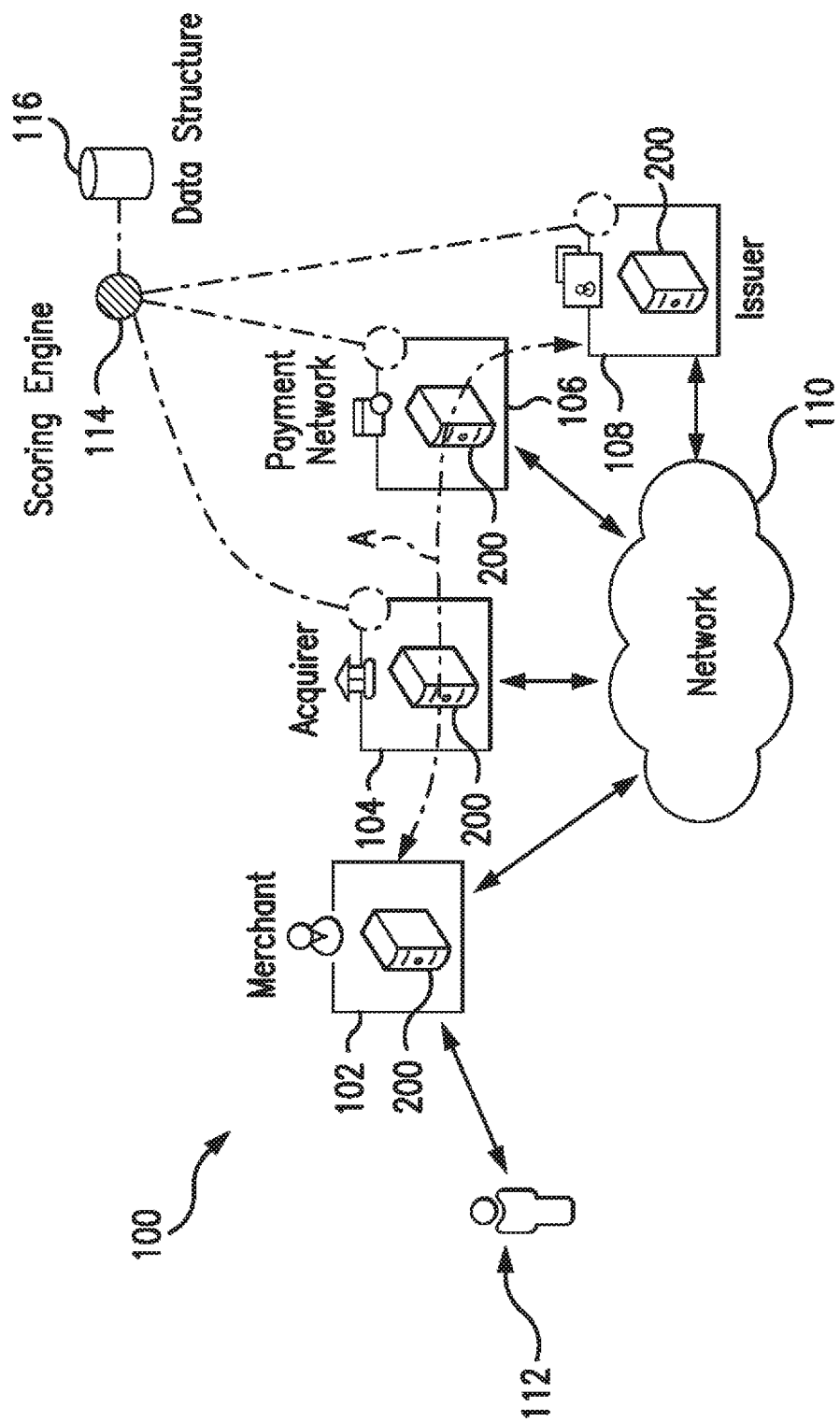
FIG. 1 is an exemplary system of the present disclosure operable to provide chargeback scoring for network transactions.

FIG. 1 illustrates an exemplary system 100 in which one or more aspects of the present disclosure may be implemented. Although the system 100 is presented in one arrangement, other embodiments may include systems arranged otherwise depending, for example, on parties included in the system 100, processing of payment account transactions, etc.

The illustrated system 100 generally includes a merchant 102, an acquirer 104 associated with the merchant 102, a payment network 106, and an issuer 108 configured to issue payment accounts to consumers, each of which is coupled to (and is in communication with) network 110. The network 110 may include, without limitation, a local area network (LAN), a wide area network (WAN) (e.g., the Internet, etc.), a mobile network, a virtual network, and/or another suitable public and/or private network capable of supporting communication among two or more of the parts of the system 100 illustrated in FIG. 1, or any combination thereof. For example, the network 110 may include multiple different networks, such as a private payment transaction network made accessible by the payment network 106 to the acquirer 104 and the issuer 108 and, separately, the public Internet, which is accessible as desired to the merchant 102, the acquirer 104, the issuer 108, and a consumer 112 (or specifically, a communication device associated therewith), etc.

The merchant 102 in the system 100 is configured to offer for sale and to sell products to consumers including, for example, the consumer 112. The merchant 102 may be disposed and/or accessible at one or more physical locations, such as, for example, at one or more brick-and-mortar locations, and/or at one or more virtual locations, such as, for example, via one or more network-based applications (e.g., a website, etc.). Regardless of the location(s), consumers (e.g., the consumer 112, etc.) are able to interact with the merchant 102 to purchase products.

In addition in the system 100, the consumer 112 is associated with a payment account, which is issued to the consumer 112 by the issuer 108. The consumer 112 is then able to use the payment account to fund transactions for products with merchants, including the merchant 102.

In one exemplary transaction, when the consumer 112 identifies a product to purchase at the merchant 102, the consumer 112 presents a payment device associated with his/her payment account to the merchant 102, thereby initiating a purchase transaction for the identified product (broadly, a network transaction). In turn, the merchant 102 is configured to receive and/or retrieve credentials for the consumer's payment account from the payment device, for example, via a point-of-sale (POS) terminal. The merchant 102 is configured to then compile an authorization request (broadly an authorization message) for the transaction, including the payment account credentials, and to communicate the authorization request to the acquirer 104 through the network 110 (along path A in FIG. 1). In turn, the acquirer 104 communicates the authorization request with the issuer 108, through the payment network 106 (again via the network 110), such as, for example, through the MasterCard®, VISA®, Discover®, or American Express® payment network, etc. The issuer 108 is configured to then receive the authorization request and either approve or decline the transaction (e.g., determine if the user's payment account is in good standing and if there is/are sufficient credit/funds to complete the transaction, etc.). In response, the issuer 108 is configured to compile an authorization reply (broadly an authorization message) and to communicate the authorization reply back to the merchant 102 (again generally along path A), and the merchant 102 is then able to proceed in the transaction (when approved) or request alternate funds (when declined). If approved, the transaction is later cleared and settled by and between the merchant 102 and the acquirer 104 and by and between the acquirer 104, the payment network 106, and the issuer 108 (in accordance with appropriate settlement arrangements, etc.).

Transaction data is generated, collected, and stored as part of the above interactions among the merchant 102, the acquirer 104, the payment network 106, and the issuer 108, etc. The transaction data, in this exemplary embodiment, is stored at least by the payment network 106 (e.g., in a data structure associated with the payment network 106 (and/or associated with a scoring engine 114, as described below), etc.). Transaction data may include, for example, payment account numbers (e.g., primary account numbers (PANs), etc.), transaction amounts, merchant IDs, merchant category codes (MCCs), region codes for merchants involved in transactions and/or POS terminals associated with the merchants, merchant names, dates/times, products purchased and related descriptions or identifiers thereof, etc. It should be appreciated that more or less information related to transactions, as part of either authentication of consumers (as is generally conventional), authorization and/or clearing and/or settling of the transactions, etc. may be included in transaction data and stored within the system 100, at the merchant 102, the acquirer 104, the payment network 106, and/or the issuer 108. Further, data unrelated to particular payment accounts may be collected by a variety of techniques, and similarly stored within the system 100.

In various exemplary embodiments, consumers involved in the different transactions herein (e.g., consumer 112, etc.) are prompted to agree to legal terms associated with their payment accounts, for example, during enrollment in their accounts, upon installation of related applications to their communication devices, etc. In so doing, the consumers may voluntarily agree, for example, to allow certain entities to use transaction data collected during enrollment and/or collected in connection with processing the transactions, subsequently, at least for one or more of the different purposes described herein.

While only one consumer 112 is shown in the system 100 in FIG. 1, it should be appreciated that more than one consumer may be included in the system 100 and/or in other system embodiments. Similarly, while only one merchant 102, one acquirer 104, one payment network 106, and one issuer 108 are illustrated, it should be appreciated that any number of these parties (and their associated components) may be included in the system 100, or may be included as a part of systems in other embodiments, consistent with the present disclosure.

Figure 2:
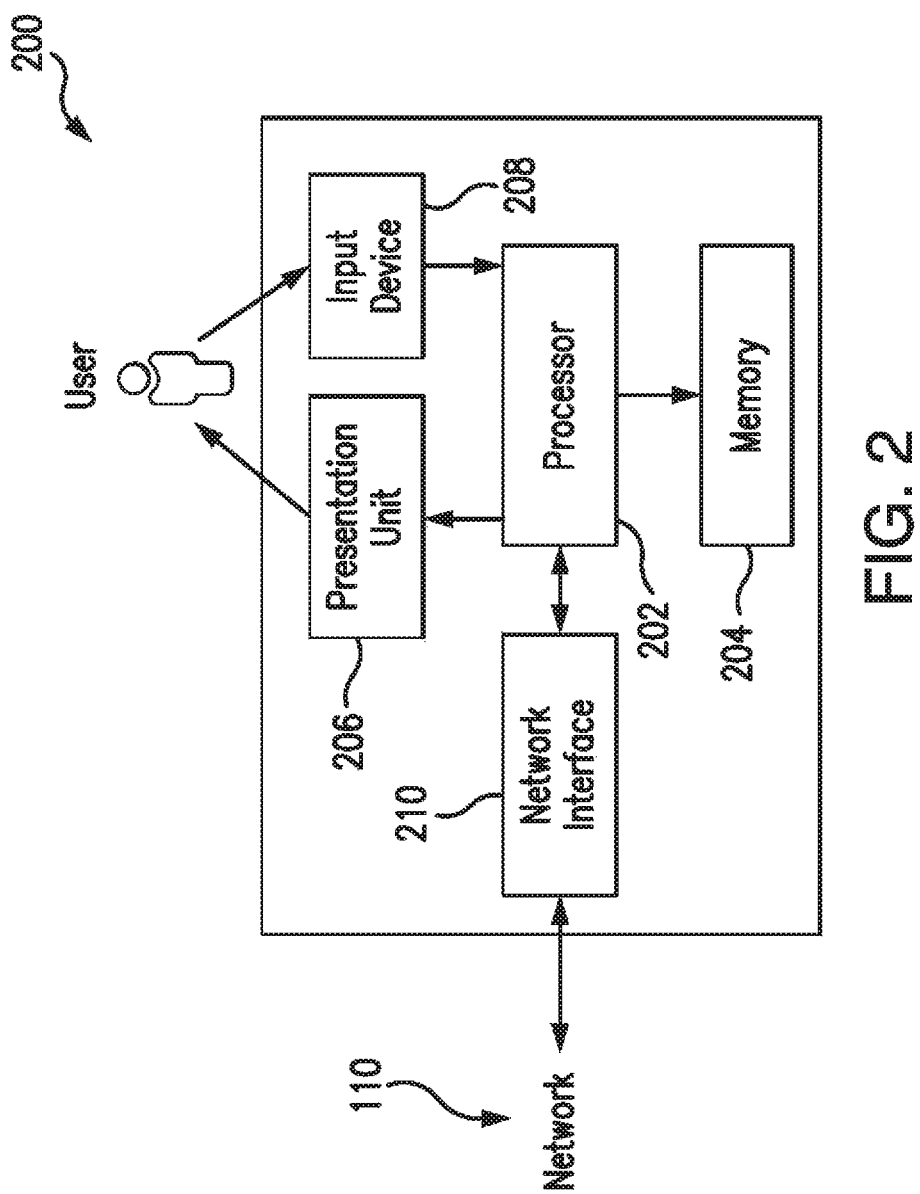
FIG. 2 is a block diagram of an exemplary computing device that may be used in the system of FIG. 1.

FIG. 2 illustrates an exemplary computing device 200 that can be used in the system 100. The computing device 200 may include, for example, one or more servers, workstations, personal computers, laptops, tablets, smartphones, PDAs, terminals, etc. In addition, the computing device 200 may include a single computing device, or it may include multiple computing devices located in close proximity or distributed over a geographic region, so long as the computing devices are specifically configured to function as described herein. In the system 100 of FIG. 1, each of the merchant 102, the acquirer 104, the payment network 106, and the issuer 108 are illustrated as including, or being implemented in, a computing device 200 coupled to (and in communication with) the network 110. That said, however, the system 100, or parts thereof, should not be understood to be limited to the computing device 200, as other computing devices may be employed in other system embodiments. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permits data, instructions, etc. to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable storage media. The memory 204 may be configured to store, without limitation, transaction data and/or other types of data (and/or data structures) as needed and/or suitable for use as described herein. In connection therewith, Table 1 includes exemplary transaction data and/or other data which may be stored in the memory 204 and relied upon as factors herein (broadly, transaction details).

The computing device 200 also includes an input device 208 that receives inputs from the user (i.e., user inputs) such as, for example, product purchase requests, requests for chargebacks, etc., or inputs from other computing devices. The input device 208 is coupled to (and is in communication with) the processor 202 and may include, for example, a keyboard, a pointing device, a mouse, a stylus, a touch sensitive panel (e.g., a touch pad or a touch screen, etc.),

TABLE 1

| | |
|---|---|
| Merchant Historical Data | Past chargeback disputes (including results thereof); past fraud related events; past customer complaints on dispute related refunds; past customer complaints regarding problems with goods sold; etc. |
| Merchant Profile | Merchant Underwriting Score (e.g., as generated at the time of onboarding of the merchant) Latest credit risk profile (e.g., real time merchant credit check information, etc.); length of business; size of business; MCC; location of business; merchant owner(s) Know-Your-Customer (KYC) checks; risk profile; etc. |
| Transaction Factors (including real time or near real time transaction information) | Consumer card authorization details (including different kinds of authorization codes based on the information available during the transaction, during issuer authorization, or during processing by a payment network on behalf of an issuer during the issuer authorization, etc.); details of incomplete consumer card authorization; time and amount of the transaction; any missing information in the authorization message (e.g., a standard transaction message (e.g., a standard authorization request for a transaction or authorization reply to the authorization request for the transaction, etc.), etc.); etc. |
| Consumer Historical Data | Past chargeback cases and results (including frequency of chargeback cases raised, etc.); past fraud related activities; past complaints raised in chargeback cases regarding goods bought; any patterns in chargeback cases and/or complaints previously raised, etc. |
| Consumer Profile | Consumer credit profile (e.g., real-time consumer credit score, consumer credit history check information (e.g., based on a check by an issuer associated with a payment card of the consumer, etc.), etc.); consumer location on the card profile; consumer location at the time of the transaction; consumer overall risk profile based on past transactions; etc. |

Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 that is performing one or more of the various operations herein. It should be appreciated that the memory 204 may include a variety of different memories, each implemented in one or more of the operations or processes described herein.

In the exemplary embodiment, the computing device 200 includes a presentation unit 206 that is coupled to (and that is in communication with) the processor 202 (however, it should be appreciated that the computing device 200 could include output devices other than the presentation unit 206, etc.). The presentation unit 206 outputs information (e.g., product information, purchase details, decline indicators, etc.), either visually or audibly, to a user of the computing device 200, for example, the consumer 112 in the system 100 (in connection with a computing device associated with the consumer 112, etc.), a user associated with the merchant 102, a user associated with the issuer 108, etc. In connection therewith, various interfaces (e.g., as defined by network-based applications, etc.) may be displayed at computing device 200, and in particular at presentation unit 206, to display such information. The presentation unit 206 may include, without limitation, a liquid crystal display (LCD), a light-emitting diode (LED) display, an organic LED (OLED) display, an "electronic ink" display, speakers, etc. In some embodiments, presentation unit 206 may include multiple devices.

another computing device, and/or an audio input device. Further, in various exemplary embodiments, a touch screen, such as that included in a tablet, a smartphone, or similar device, may behave as both the presentation unit 206 and the input device 208.

In addition, the illustrated computing device 200 also includes a network interface 210 coupled to (and in communication with) the processor 202 and the memory 204. The network interface 210 may include, without limitation, a wired network adapter, a wireless network adapter, a mobile network adapter, or other device capable of communicating to/with one or more different networks, including the network 110. Further, in some exemplary embodiments, the computing device 200 may include the processor 202 and one or more network interfaces incorporated into or with the processor 202.

Referring again to FIG. 1, the system 100 includes the scoring engine 114, which is configured, by executable instructions, to operate as described herein. The scoring engine 114 is shown in FIG. 1 as a standalone part of the system 100 and, in connection therewith, may be considered a computing device generally consistent with computing device 200. Alternatively, and as indicated by the dotted lines in FIG. 1, the scoring engine 114 may be incorporated, in whole or in part, into the acquirer 104, the payment network 106, and/or the issuer 108 (e.g., into the computing devices 200 therein or as separate computing devices in communication therewith, etc.). In addition, the scoring engine 114 is coupled to a data structure 116, which may be standalone from the scoring engine 114 or, as indicated by the dotted line, may be incorporated in whole, or in part, with the scoring engine 114 (e.g., where the data structure 116 is associated with memory 204 of the scoring engine 114, etc.). The data structure 116 includes, at the least, transaction data for the payment account associated with the consumer 112 and potentially other consumers, and transaction data for the merchant 102 and potentially other merchants, etc. In connection therewith, the data underlying the factors listed in Table 1 (as well as the factors included therein (e.g., where the data in Table 1 is arranged according to the factors therein, etc.)), for example, may be included in the data structure 116, in whole or in part.

In this exemplary embodiment, the scoring engine 114 is generally configured as a service, which may be called internal to the payment network 106 or external from the acquirer 104 and/or the issuer 108, etc. In one example, the scoring engine 114 is integrated into the payment network 106, such that when an authorization request passes through the payment network 106 (e.g., as described for the example transaction above, etc.) (e.g., after the payment network 106 receives the authorization request, etc.), the scoring engine 114 is configured to intercept the authorization request and operate as described herein to analyze the authorization request to determine a chargeback probability score. The scoring engine 114 may also be configured to intercept an authorization reply from the issuer 108, such that when an authorization reply passes through the payment network 106 (e.g., as described for the example transaction above, etc.), the scoring engine 114 is configured to intercept the authorization reply and operate as described herein.

In either case, in one or more embodiments, the scoring engine 114 may be configured to intercept the authorization request and/or the authorization reply (broadly, the authorization message) based on the acquirer 104 and/or the issuer 108 subscribing to the scoring engine 114 and/or a service offered in relation thereto (e.g., a free service or a pay service (e.g., pay per usage, etc.). With reference again to system 100 of FIG. 1, and in particular in this exemplary embodiment, once the authorization request for the transaction is intercepted, the scoring engine 114 is particularly configured to determine a chargeback probability score for the transaction, based on the factors described herein (see, e.g., one or more factors identified in Table 1, etc.). It should be appreciated that the scoring engine 114 may be configured to determine a chargeback probability score for the transaction using one of a variety of algorithms (e.g. by compiling an algorithm, etc.). As one example, the algorithm used may be an algorithm developed by an entity associated with the scoring engine 114, or another entity. As another example, the algorithm used may also, or alternatively, be a modification of a preexisting algorithm (e.g., an algorithm for calculating a merchant underwriting score, where the algorithm is modified to determine a score based the factors described herein (e.g., one or more factors identified in Table 1, etc.). It should also be appreciated that the algorithm may vary based on market regulations and/or other requirements external to the entity associated with the scoring engine 114. In connection therewith, it should be appreciated that one or more of the actual factors used by the scoring engine 114 to determine the chargeback probability score (e.g., one or more of the transaction factors of Table 1, one or more of the merchant historical factors of Table 1, etc.) may be included in the intercepted authorization request (or other intercepted message) as transaction details, whereby the scoring engine 114 may be configured to determine the chargeback probability score based on the transaction details included in the authorization request (where the transaction details are obtained by the scoring engine 114 from the authorization request). However, in some embodiments, the scoring engine 114 may additionally use (or may alternatively use) other factors, details, etc. obtained from the data structure 116 (e.g., consistent with one or more factors, details, etc. exemplified in Table 1, etc.) to determine the chargeback probability score.

The scoring engine 114 is configured to then append the chargeback probability score to the authorization request (broadly, as chargeback data). And, in turn, the scoring engine 114 is configured to release the authorization request (with the chargeback probability score appended thereto), and the authorization request is permitted to pass to the issuer 108 for processing as described above.

Also in this exemplary embodiment, in connection with determining to approve or decline the transaction, the issuer 108 is configured to initially determine if the chargeback probability score satisfies, or does not satisfy, one or more predefined thresholds. It should be appreciated that the one or more predefined thresholds may be set (e.g., to one or more values) based on risk tolerance of the issuer 108 and/or the acquirer 104, for example, based on a sensitivity analysis of prior chargeback events. In any event, it should be appreciated that the one or more thresholds may be subject to continued refinements (e.g., based on continued sensitivity analysis of prior chargeback events and/or one or more variables listed in Table 1, etc.). When the chargeback probability score does not satisfy the one or more thresholds, the issuer 108 may be configured to decline the transaction (e.g., without further conventional processing of the transaction, etc.). Conversely, when the chargeback probability score does satisfy the one or more thresholds, the issuer 108 may be configured to further evaluate the transaction and either approve or decline the transaction as indicated by other analysis of the transaction and/or the payment account therein (e.g., based on sufficient funds being present in the payment account, etc.), etc. Such further evaluation may or may not particularly take into account a value of the chargeback probability score (e.g., the issuer 108 may simply determine to approve or decline the transaction in a conventional manner, or the issuer 108 may take into account the specific value of the chargeback probability score in combination with other conventional processes to determine whether or not to approve or decline the transaction, etc.). Notwithstanding the discussion of the above exemplary embodiment (where the scoring engine 114 is configured to append the chargeback probability score to the authorization request), in one or more other embodiments, the payment network 106, and more specifically, the scoring engine 114, may be configured to determine if the chargeback probability score satisfies the one or more thresholds, or not, and to decline the transaction as appropriate (instead of relying on the issuer 108 to make such determination). The authorization request then may proceed to the issuer 108 without modification for approval or decline (when the scoring engine 114 determines that the chargeback probability score satisfies the one or more thresholds). However, the authentication request may not even be transmitted to the issuer 108 if the transaction is declined by the scoring engine 114 based on the chargeback probability score.

Alternatively, in lieu of (or in addition to) the scoring engine 114 intercepting (e.g., automatically intercepting, etc.) the authorization request, the scoring engine 114 may be configured for invocation by another entity, system, and/or component, etc., such as, for example, the acquirer 104 and/or the issuer 108 as desired. In this manner, it should be appreciated that the scoring engine 114 may not be configured to intercept an authorization request based on its traversal through a payment network 106 alone. Instead, upon receipt of the authorization request from the merchant 102 (or an authorization reply from the payment network 106), the acquirer 104 may be configured to call an application programming interface (API) associated with the scoring engine 114, wherein the acquirer 104 provides details of the transaction to the scoring engine 114 and requests a chargeback probability score for the transaction. In response, the scoring engine 114 may be configured to determine the chargeback probability score (e.g., consistent with the score determination discussed above, etc.) and transmit the same back to the acquirer 104. The acquirer 104, then, may be configured to determine if the chargeback probability score satisfies, or does not satisfy, one or more predefined thresholds (e.g., consistent with the threshold determination discussed above in relation to the issuer 108, etc.). The acquirer 104, then, may decline the transaction if the chargeback probability score does not satisfy the one or more thresholds, or forward the authorization request on to the payment network 106 for processing in a conventional manner if the chargeback probability score does satisfy the one or more thresholds.

Similarly, the issuer 108, upon receipt of an authorization request via the payment network 106 for a transaction, may be configured to call an API associated with the scoring engine 114 (e.g., consistent with the API call that may be made by the acquirer 104, etc.), wherein the issuer 108 provides details of the transaction to the scoring engine 114 and requests a chargeback probability score for the transaction. In response, again, the scoring engine 114 may be configured to determine the chargeback probability score for the transaction and transmit the same back to the issuer 108 (e.g., consistent with the determination and response discussed above in relation to the acquirer 104, etc.).

In any event, under both of the aforementioned alternatives regarding the scoring engine 114 being specifically invoked by the acquirer 104 and/or issuer 108, upon receipt of the chargeback probability score, the acquirer 104 and/or the issuer 108 may be configured to then determine whether to decline the transaction, or not, based on the chargeback probability score and one or more thresholds therefore set by the acquirer 104 and/or issuer 108 and/or the payment network 106, etc. If the transaction is not declined based on the chargeback probability score, the acquirer 104 and/or issuer 108 may be configured to then permit the transaction to proceed as described above for the example transaction between the consumer 112 and the merchant 102 (e.g., in a conventional manner, etc.).

In addition, under either of the alternatives with respect to the acquirer 104 and/or the issuer 108 specifically invoking the scoring engine 114, it should be appreciated that the scoring engine 114 may alternatively (or additionally) be configured to determine if the chargeback probability score satisfies, or does not satisfy, one or more predefined thresholds (e.g., in the same manner discussed above in relation to the issuer 108, etc.). The scoring engine 114, then, may transmit an indication (e.g., an indicator, a flag, a warning, etc.) back to the acquirer 104 and/or the issuer 108 of whether the chargeback probability score does, or does not, satisfy the threshold(s) (e.g., a "success"/"failure" message or indicator, an "approve"/"decline" message or indicator; etc.) (broadly, chargeback data). Based on the indication, the acquirer 104 and/or the issuer 108 may then be configured to decline the transaction if the chargeback probability score does not satisfy the threshold, or otherwise permit the transaction to proceed as described above for the example transaction between the consumer 112 and the merchant 102 (e.g., in a conventional manner, etc.).

Further, in the above embodiment where the payment network 106 and/or the scoring engine 114 is configured to intercept the authorization message and compare the determined chargeback probability score to one or more thresholds, it should be appreciated that, in one or more embodiments, the scoring engine 114 may be similarly configured to transmit an indication back to the acquirer 104 and/or the issuer 108 of whether the chargeback probability score does, or does not, satisfy the one or more thresholds (broadly, chargeback data) (in lieu of, or in addition to, transmitting the chargeback probability score itself to the acquirer 104 and/or the issuer 108). The indicator may be appended to the authorization message (potentially, in addition to the chargeback score also being appended to the authorization message), whereby the indicator message is transmitted to the acquirer 104 and/or the issuer 108 via the authorization message. Or, the indicator may be transmitted as (or as a part of) a different message. In either case, the acquirer 104 and/or the issuer 108 may determine to decline a transaction, based on the indicator, without having to specifically analyze and/or compare the chargeback probability score.

It should also be appreciated that that payment network 106 and/or the scoring engine 114 may be configured to intercept the authorization message in response to a request (e.g., a chargeback probability score request, etc.) from the acquirer 104 and/or issuer 108, such that the request indicates to the payment network 106 and/or the scoring engine 114 that authorization message of the transaction (and/or one or more other factors (e.g., one or more factors in Table 1, etc.)) should be analyzed (consistent with the above) to determine a chargeback probability score. The scoring engine 114, then, may be configured to respond consistent with the discussion above after determining a chargeback probability score (e.g., to append the chargeback probability score to the authorization message, transmit the chargeback probability score to the acquirer 104 and/or issuer 108, etc., potentially in accordance with one or more instructions or indications in the request, etc.). In one or more embodiments, the payment network 106 and/or the scoring engine 114 may be configured to intercept the authorization message only in response to a request from the acquirer 104 and/or issuer 108 to analyze the transaction to determine a chargeback probability.

While the above description of the operation of the scoring engine 114 relies on APIs in some embodiments for invocation by the acquirer 104 and/or the issuer 108, it should be appreciated that the acquirer 104 and/or the issuer 108 may rely on network-specific messaging to request and receive the chargeback probability score from the scoring engine 114 in other embodiments, etc. What's more, while the above is generally described in terms of an authorization request, it should be appreciated that the scoring engine 114 may also (or alternatively) be configured to intercept an authorization reply from the issuer 108 (e.g., based on the payment network 106 passing the reply to the scoring engine 114, etc.).

Figure 3:
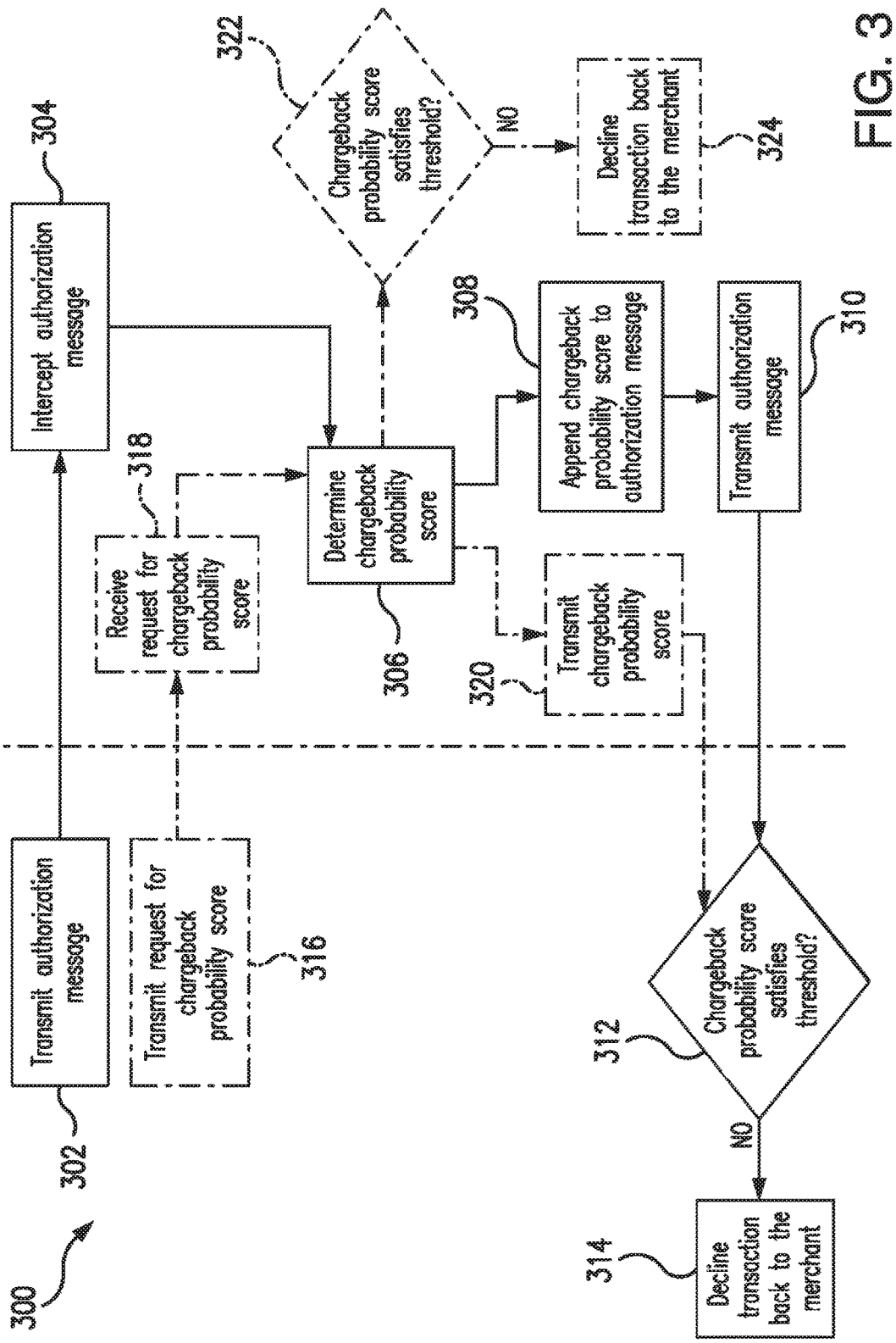
FIG. 3 is an exemplary method, which may be used with the system of FIG. 1, for providing chargeback scoring for network transactions, whereby an issuer, an acquirer, or another party associated with the transactions may decline one or more of the transactions, based on the chargeback scoring.

FIG. 3 illustrates an exemplary method 300, for use in providing chargeback probability scores in connection with payment account transactions. The exemplary method 300 is described as implemented in the scoring engine 114 of the system 100, and also with reference to the acquirer 104 and the issuer 108, with it being understood that the scoring engine 114 is capable of performing one or more of the various operations of the method 300. Additional reference is also made to the computing device 200. However, the methods herein should not be understood to be limited to the system 100 and/or the computing device 200. Likewise, the systems and devices herein should not be understood to be limited to the method 300.

The method 300 is further described with reference to the consumer 112, and an example transaction by the consumer 112 (using his/her payment account issued by the issuer 108) to purchase a product from the merchant 102. In general, and specific to the transaction, certain factors are generated and stored in data structure 116 related to the consumer 112, the merchant 102, and the specific transaction. Exemplary ones of the factors, with corresponding parameters (or values or sub-scores) for the above example transaction, are summarized in Table 2.

TABLE 2

|  | Example Factors | Example Parameter Values |
|---|---|---|
| Historical Data of Merchant 102 | Past chargeback disputes (e.g., no disputes in the last twelve months = 1, one to three disputes in the last twelve months = 2, and four and above disputes in the last twelve months = 3; etc.) | 2 |
|  | Past fraud related events (e.g., no fraud events in the last twelve months = 1, one to three fraud events in the last twelve months = 2, and four and above fraud events in the last twelve months = 3; etc.) | 1 |
|  | Past customer complaints on dispute related refunds (e.g., no complaints in the last twelve months = 1, one to three complaints in the last twelve months = 2, and four and above complaints in the last twelve months = 3; etc.) | 2 |
|  | Past customer complaints regarding problem with goods sold (e.g., no complaints in the last twelve months = 1, one to three complaints in the last twelve months = 2, and four and above complaints in the last twelve months = 3; etc.) | 1 |
| Profile for Merchant 102 | Latest credit risk profile (e.g., high risk = 3, medium risk = 2, low risk = 1; etc.) | 1 |
|  | Length of business (e.g., less than one year = 3, one year or greater = 1; etc.) | 1 |
|  | Size of business (e.g., small = 3, medium = 2, large = 1; etc.) | 3 |
|  | MCC (e.g., Retail = 2, Airlines = 2; etc., where each MCC is associated with a particular value/parameter) | 2 |
|  | Location of business (e.g., state, province, city, country, zip code, etc., where parameters/values are applied based on the particular location) | 2 |
|  | Merchant owner(s) KYC checks (e.g., performed less than one year ago = 1, performed one year or greater = 3; etc.) | 1 |
|  | Merchant Underwriting Score (e.g., low score (e.g., a poor score) = 3, average score = 2, high score (e.g., a good score) = 1, etc.) | 2 |
| Transaction | Consumer card authorization details (e.g., authorization code present in authorization message (authorization code present-business as usual (BAU) = 0, authorization code not present = 2; etc.), other details or information present in the authorization message, etc.) | 0 |
|  | Date, time and/or amount of transaction (BAU transaction information (e.g., when date, time and/or amount of transaction is/are within a predefined range = 1, when date, time and/or amount of transaction is/are outside the predefined range = 3; etc.) (where the predefined range may be based on historical chargeback data, etc.) | 1 |
|  | Any missing information in the transaction message (e.g., a standard authorization request for a transaction or authorization reply to the authorization request for the transaction, etc.) (e.g., BAU transaction information missing = 3, BAU transaction information present = 1; etc.) | 1 |
| Historical Data of Consumer 112 | Past chargeback cases and results (e.g., no chargebacks in the last twelve months = 1, one to three chargebacks in the last twelve months = 2, and four and above chargebacks in the last twelve months = 3; etc.) | 1 |
|  | Past fraud related activities (e.g., no fraud activities in the last twelve months = 1, one to three fraud activities in the last twelve months = 2, and four and above fraud activities in the last twelve months = 3; etc.) | 1 |
|  | Past customer complaints regarding products bought (e.g., no complaints in the last twelve months = 1, one to three complaints in the last twelve months = 2, and four and above complaints in the last twelve months = 3; etc.) | 1 |
| Profile for Consumer 112 | Consumer credit profile (e.g., based on credit scores, etc.) (e.g., high = 1, medium = 2, low = 3; etc.) | 1 |
|  | Consumer location on the card profile (e.g., state, province, city, country, zip code, etc., where parameters/values are applied based on the particular location) | 1 |
|  | Consumer location at the time of transaction (e.g., state, province, city, country, zip code, etc., where parameters/values are applied based on the particular location) | 2 |
|  | Consumer overall risk profile based on past transactions (e.g., high = 3, medium = 2, low = 1; etc.) | 1 |

Conventionally in the example transaction (and as described above in the system 100), an authorization request (broadly, an authorization message) for the transaction is initially compiled at the merchant 102 and transmitted to the acquirer 104. In turn, the acquirer 104 passes the authorization request to the payment network 106, which passes the authorization request along to the issuer 108. The issuer 108 then compiles and provides an authorization reply (broadly, also an authorization message) back to the payment network 106. With that said, in connection with the method 300, either the acquirer 104 or the issuer 108 transmits an authorization message (be it the authorization request (in the case of the acquirer 104) or the authorization reply (in the case of the issuer 108)) to the payment network 106, at 302. In response, the scoring engine 114 and/or the payment network 106 receives and/or intercepts the authorization message, at 304. In one or more embodiments, the scoring engine 114 and/or the payment network 106 may receive and/or intercept the authorization message based on the acquirer 104 and/or the issuer 108 subscribing to the scoring engine 114, the payment network 106, and/or a service offered in relation thereto (e.g., a free service or a pay service (e.g., pay per usage, etc.).

With continued reference to method 300 of FIG. 3, the scoring engine 114 may receive/intercept the authorization message directly from the acquirer 104 or the issuer 108 or, in one or more embodiments, the scoring engine 114 may indirectly receive the message from the acquirer 104 or issuer 108, such that, for example, the payment network 106 receives/intercepts the authorization message from the acquirer 104 or the issuer 108 and forwards the authorization message to the scoring engine 114. It should be appreciated that in the example method 300, when the authorization message is not transmitted directly to the scoring engine 114, at 302, but rather to the payment network 106, the payment network 106 forwards the authorization message to the scoring engine 114, such that the authorization message (in either case) is still considered received/intercepted, whereby the example method 300 modifies, overrides, etc. the conventional route and processing protocol for the authorization message.

When the scoring engine 114 and/or the payment network 106 receives/intercepts the authorization message, the scoring engine 114 determines, at 306, a chargeback probability score for the transaction identified in the authorization message, the merchant 102, and/or the consumer 112, etc. Specifically, for example, the scoring engine 114 initially, based on historical transaction data associated with chargebacks and/or not associated with chargebacks (e.g., in general, specific to the consumer 112 involved in the transaction, specific to the merchant 102 involved in the transaction, specific to a group including the consumer involved in the transaction, specific to a group including the merchant 102 involved in the transaction, specific to a region, etc.), compiles at least one algorithm (e.g., a chargeback probability algorithm, etc.) which reduces the factors considered (e.g., the factors and parameters included in Table 2 for the given transaction, etc.) to a chargeback probability score. In this way, the algorithm combines and/or provides weighting for one or more of the factors considered and the parameters for each of the factors, such that the resulting score is determined by the scoring engine 114, via the algorithm, and is indicative of a probability of a chargeback for the given transaction. The compiled at least one algorithm may, for example, be an algorithm consistent with that which is described above in relation to system 100 of FIG. 1.

In addition to the algorithm itself, the historical transaction data may also be utilized to provide one or more thresholds specific to the algorithm (and/or the factors associated with selection of the algorithm for the given transition), for use as described below. The one or more thresholds may, for example, be determined as described above in relation to system 100 of FIG. 1, where, for example, historical transaction data is utilized in a sensitivity analysis of prior chargeback events. With that said, it should be appreciated that the factors and/or parameters may be combined in various manners via the algorithm(s) and/or threshold(s), relying on the same or different historical transaction data, for example, with certain of the factors being considered, not considered, or weighted to improve or otherwise change accuracy and/or reliability of the scoring.

After the chargeback probability score is determined, the scoring engine 114 and/or the payment network 106 appends, at 308, the chargeback probability score to the intercepted authorization message and transmits, at 310, the authorization message along to the issuer 108 or the acquirer 104, as appropriate (depending on when the authorization message is intercepted (e.g., if the scoring engine 114 and/or the payment network 106 intercepts an authorization reply from the issuer 108, the scoring engine 114 and/or the payment network 106 will transmit the authorization message along to the acquirer 104; if the scoring engine 114 and/or the payment network 106 intercepts an authorization request from the acquirer 104, the scoring engine 114 and/or the payment network 106 will transmit the authorization message along to the issuer 108). For purposes of illustration, the authorization message is described next as transmitted from the scoring engine 114 and/or the payment network 106 to the issuer 108 (e.g., where the authorization message is the authorization request and is intercepted when transmitted by the acquirer 104, etc.). As such, at 312, the issuer 108 in turn determines whether the chargeback probability score satisfies one or more thresholds and then, when the one or more thresholds are not satisfied (indicating that the transaction poses a chargeback risk, etc.), the issuer 108 declines the transaction, at 314, and transmits the decline (e.g., as part of an authorization reply, etc.) back to the merchant 102 (via the payment network 106 and the acquirer 104) (broadly, declines the transaction back to the merchant). However, when the chargeback probability score satisfies the one or more thresholds, at 312, the issuer 108 may proceed with the transaction as is conventional (e.g., determine if the consumer's payment account is in good standing, determine if the consumer's payment account has sufficient funds for the transaction, etc.).

With that said, the one or more thresholds may be provided by the acquirer 104, the payment network 106, and/or the issuer 108 (e.g., with each providing a threshold to be used for each transaction, with one or more providing a threshold to be used by all of the others, with each using their own threshold, etc.). In addition, the one or more thresholds may vary based on the merchant category for the transaction, the specific country in which the transaction occurred, the profile for the issuer 108, etc. As an example, the chargeback probability score may be presented by the scoring engine 114 on a scale of 0-100, and a threshold may then include a value on the same scale indicating that a score below the threshold represents a low likelihood that the transaction will involve a chargeback while a score equal to or above the threshold represents a high likelihood that the transaction will involve a chargeback (whereby the underlying transaction may be declined). It should be appreciated that multiple such thresholds may be used to indicate other levels of probability that a transaction will involve a chargeback.

Conversely, for the scenario where the authorization message is transmitted from the scoring engine 114 and/or the payment network 106 to the acquirer 104 (e.g., where the authorization message is the authorization reply and is intercepted when transmitted from the issuer 108, etc.), at 310, the acquirer 104 determines whether the chargeback probability score satisfies one or more thresholds, at 312 (as described above), and then, when the one or more thresholds are not satisfied, the acquirer 104 declines the transaction, at 314, and transmits the decline (e.g., as part of the authorization reply or separate therefrom, etc.) back to the merchant 102. However, when the chargeback probability score satisfies the one or more thresholds, the acquirer 104 may proceed with the transaction as is conventional (e.g., convey the authorization message approving the transaction to the merchant 102, etc.).

As shown (and as can be appreciated from the above description), in the illustrated method 300, the scoring engine 114 may be involved in the transaction in one or more different manners, as indicated by the dotted lines in FIG. 3. Specifically, for example, in one aspect the acquirer 104 may, upon receipt of the authorization message (e.g., either where the authorization message is the authorization request from the merchant 102, or where the authorization message is the authorization reply from the issuer 108 (via the payment network 106), etc.), transmit a particular request to the scoring engine 114, at 316, for a chargeback probability score. In response, the scoring engine 114 receives the request for the chargeback probability score, at 318, and consistent with the above, determines a chargeback probability score for the transaction, the merchant 102, and/or the consumer 112, etc., at 306. The scoring engine 114 then transmits the chargeback probability score, at 320, back to the acquirer 104 (or, depending on the status of the transaction, simply appends the chargeback probability score to the authorization message for the transaction, at 308, and then transmits the authorization message to the acquirer 104, at 310). And, as described above, the acquirer 104 determines whether the chargeback probability score satisfies one or more thresholds, at 312, and, when the one or more thresholds are not satisfied, the acquirer 104 declines the transaction, at 314, and transmits the decline back to the merchant 102.

In another aspect, the scoring engine 114 and/or the payment network 106 may optionally rely on the chargeback probability score to directly decline the transaction (e.g., in the case where the chargeback probability score is determined in response to an intercepted message or in the case where the chargeback probability score is determined in response to the scoring engine 114 receiving a request for a chargeback probability score (e.g., from the acquirer 104, etc.), etc.). Specifically, for example, when the chargeback probability score is determined for the transaction, the merchant 102, and/or the consumer 112, etc., at 306, the scoring engine 114 and/or the payment network 106 may determine whether the chargeback probability score satisfies one or more thresholds, at 322 (in a similar manner to the above description for operation 312), and, when the one or more thresholds are not satisfied, decline the transaction, at 324, and transmit the decline back to the merchant 102 (via the acquirer 104) (e.g., as part of the authorization reply for the transaction, as a separate message, etc.) (broadly, decline the transaction back to the merchant). However, again, when the chargeback probability score satisfies the one or more thresholds, the payment network 106 may proceed with the transaction as is conventional (e.g., convey the authorization message for the transaction to the appropriate one of the issuer 108 or the acquirer 104, depending on the status of processing the transaction; etc.).

With that said, rather than declining the transaction as described above, the acquirer 104, the payment network 106, the issuer 108, or other entity, in relying on the chargeback probability score determined by the scoring the engine 114, may take one or more other actions including, for example, holding the transaction in settlement, further investigating the transaction through interaction with the merchant 102 and/or the consumer 112 involved therein, etc. In general, though, the chargeback probability score provides a basis to delay or hold completing the transaction and or transferring funds based on the transaction until one or more of the entities involved is satisfied with the particular transaction (e.g., confident that the transaction will likely not involve a chargeback, etc.). In particular, for example, when either the acquirer 104, the payment network 106 and/or the issuer 108 determines the that the chargeback probability score fails to satisfy one or more thresholds, the acquirer 104, the payment network 106, and/or issuer 108 may hold the transaction and transmit a notification of the hold and/or the failure to one or more of the entities associated with the transaction. For example, and without limitation, where the payment network 106 holds the transaction, the payment network may transmit a notification of the hold and/or the failure to the issuer 108, the acquirer 104, and/or the merchant 102 (e.g., via the network 110). In one or more embodiments, the notification may also be transmitted to the consumer 112 (e.g., to a computing device 200 of the consumer 112 via the network 110). Such notification may include, in one or more embodiments, the chargeback probability score.

The entity associated with the transaction may, then, determine whether it is satisfied with the transaction proceeding and/or the chargeback probability score and transmit a satisfaction indicator to the acquirer 104, the payment network 106 and/or the issuer 108. The satisfaction indictor may indicate whether the acquirer 104, the payment network 106 and/or the issuer 108 should continue processing the transaction or decline the transaction (despite the chargeback probability score failing to satisfy the given threshold (s)). In any case, based on the satisfaction indictor, the acquirer 104, the payment network 106 and/or the issuer 108 may then lift the hold and either continue processing the transaction or decline the transaction.

In addition, or alternatively, it should be appreciated that the transaction may be held until a time interval expires (e.g., one minute, 10 minutes, 30 minutes, 1 hour, 1 day, or any time interval therebetween or otherwise, etc.).

Further, it should be appreciated that in the aspects where the scoring engine 114 and/or payment network 106 optionally relies on the chargeback probability score to directly decline the transaction and/or to take one or more other actions (e.g., holding the transaction, etc.) as described above, the scoring engine 114 and/or payment network 106 may still provide (e.g., transmit) the chargeback data (e.g., the chargeback probability score and/or an indicator that the chargeback probability score fails to satisfy the one or more thresholds, etc.) to the acquirer 104 and/or issuer 108 (e.g., by appending the chargeback probability score to an authorization message, etc.), consistent with the above. In connection therewith, the scoring engine 114 and/or payment network 106 may provide the chargeback data to the acquirer 104 and/or issuer 108 in response to a determination to directly decline the transaction and/or to take the one or more other actions based on the chargeback probability score failing to satisfy the one or more predetermine threshold.

As described herein, the scoring engine 114 determines the chargeback probability score in real time (or near real time), which therefore permits the scoring engine 114, the payment network 106, the acquirer 104 and/or the issuer 108 to act on the chargeback probability score (e.g., decline the example transaction, etc.) in connection with the authorization process for the transaction, or more broadly, prior to any clearing or settlement of the transaction. Real time, for example, may include determining and returning the chargeback probability score during authorization of the transaction, immediately after or within less than two seconds of transmission of the request and/or authorization message from the acquirer 104, the issuer 108, etc.; And, near real time may include determining and returning the chargeback probability score less than five seconds, ten seconds, thirty seconds, or one minute, etc. of transmission of the request and/or authorization message from the acquirer 104, the issuer 108, etc. It should be appreciated that all embodiments considered herein may not be completed and/or performed in real time or near real time, whereby the scoring engine 114 may determine and provide the chargeback probability score beyond the time limits described above but still within the scope of the present disclosure.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following steps: (a) obtaining at least one transaction detail of a network transaction between a consumer and a merchant; (b) determining, by a computing device, a chargeback probability score for the network transaction based, at least in part, on the at least one transaction detail; and (c) transmitting chargeback data to an entity associated with the network transaction, the chargeback data including at least one of the chargeback probability score and an indicator that the chargeback probability score fails to satisfy one or more thresholds, thereby permitting the entity to hold and/or decline the network transaction when the chargeback probability score fails to satisfy one or more thresholds.

As also will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following steps: (a) receiving, by a computing device, an authorization message for a network transaction between a consumer and a merchant; (b) obtaining, by the computing device, at least one transaction detail of the network transaction from the authorization message; (c) determining, by the computing device, a chargeback probability score for the network transaction based, at least in part, on the at least one transaction detail; and (d) declining and/or holding, by the computing device, the network transaction when the chargeback probability score for the network transaction fails to satisfy one or more predetermined thresholds.

With that said, exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature, element or layer is referred to as being "on," "engaged to," "connected to," "coupled to," "included with," "associated with," or "in communication with" another feature, element or layer, it may be directly on, engaged, connected, coupled, associated, or in communication with/to the other feature, element or layer, or intervening features, elements or layers may be present. In contrast, when feature, element or layer is referred to as being "directly on," "directly engaged to," "directly connected to," "directly coupled to," "directly associated with," or "directly in communication with" another feature, element or layer, there may be no intervening features, elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

Although the terms first, second, third, etc. may be used herein to describe various elements and operations, these elements and operations should not be limited by these terms. These terms may be only used to distinguish one element or operation from another element or operation. Terms such as "first," "second," and other numerical terms when used herein do not imply a sequence or order unless clearly indicated by the context. Thus, a first element operation could be termed a second element or operation without departing from the teachings of the exemplary embodiments.

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in determining chargeback probability scores for network transactions, the method comprising:
    intercepting and holding, by a computing device of a payment network, an authorization message for a network transaction between a consumer and a merchant in route to an acquirer and/or an issuer associated with the network transaction, the payment network coupled in communication between the acquirer and the issuer;
    obtaining, by the computing device, from the intercepted and held authorization message, at least one transaction detail of the network transaction;
    determining, by the computing device, a chargeback probability score for the network transaction through a chargeback probability algorithm, the chargeback probability algorithm based, at least in part, on the at least one transaction detail and on historical data for the merchant, wherein the chargeback probability score is specific at least to the merchant;
    transmitting, by the computing device, chargeback data to the acquirer and/or the issuer, the chargeback data including at least one of the chargeback probability score and an indicator that the chargeback probability score fails to satisfy one or more thresholds; and
    releasing, by the computing device, the authorization message to the acquirer and/or the issuer associated with the network transaction based on the acquirer and/or the issuer lifting the hold of the authorization message in response to the chargeback data.

2. The computer-implemented method of claim 1, wherein determining the chargeback probability score includes determining the chargeback probability score further based, at least in part, on a profile for the merchant.

3. The computer-implemented method of claim 1, wherein the at least one transaction detail includes one or more of: a date of the network transaction, a time of the network transaction, an amount of the network transaction, and missing data from an authorization message for the network transaction.

4. The computer-implemented method of claim 1, wherein intercepting the authorization message includes intercepting, by the computing device, an authorization request received from the acquirer, wherein the acquirer is associated with the merchant involved in the network transaction.

5. The computer-implemented method of claim 1, wherein transmitting the chargeback data includes transmitting the chargeback probability score for the network transaction to the acquirer and/or the issuer associated with the network transaction.

6. The computer-implemented method of claim 1, wherein transmitting the chargeback data includes transmitting, to the acquirer and/or the issuer associated with the network transaction, the indicator that the chargeback probability score fails to satisfy the one or more thresholds.

7. The computer-implemented method of claim 1, further comprising receiving, by the computing device, a satisfaction indicator from the acquirer and/or the issuer associated with the network transaction prior to releasing the authorization message.

8. A system for use in a payment network in imposing chargeback probability scores on network transactions, the system comprising:
    a memory including factors indicative of a chargeback probability, the factors including one or more of merchant historical data and merchant profile details, and one or more of transaction factors, consumer historical data, and consumer profile details; and
    at least one payment network processor communicatively coupled to the memory, the at least one payment network processor configured to:
        intercept and hold an authorization request received from an acquirer in route to an issuer, the authorization request associated with a transaction between a consumer and a merchant, wherein the acquirer is associated with the merchant and wherein the issuer is associated with an account involved in the transaction;
        prior to release of the authorization request to the issuer:
            obtain at least one transaction detail of the transaction from the authorization request;
            determine a chargeback probability score of the transaction through a chargeback probability algorithm, the chargeback probability algorithm based on the factors in the memory, including the merchant historical data and/or the merchant profile details, and the at least one transaction detail of the transaction; and
            transmit chargeback data to the acquirer and/or the issuer, the chargeback data including at least one of the chargeback probability score and an indicator that the chargeback probability score fails to satisfy one or more thresholds; and
        release the authorization request to the issuer based on one of the acquirer and the issuer lifting the hold of the authorization request in response to the chargeback data.

9. The system of claim 8, wherein the at least one payment network processor is further configured to decline the transaction when the chargeback probability score of the transaction fails to satisfy the one or more thresholds.

10. The system of claim 9, wherein determining the chargeback probability score includes determining the chargeback probability score further based on one or more of: a date of the transaction, a time of the transaction, an amount of the transaction, and missing data from the authorization request.

* * * * *